United States Patent
Both et al.

(10) Patent No.: US 9,880,702 B2
(45) Date of Patent: Jan. 30, 2018

(54) CONTENT STRUCTURES AND CONTENT NAVIGATION INTERFACES

(75) Inventors: Torsten Both, Tangstedt (DE); Christian Lindholm, Ekenas (FI); Bernd Scheibe, Hamburg (DE); Torsten Schulz, Pinneberg (DE)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 502 days.

(21) Appl. No.: 11/502,680

(22) Filed: Aug. 11, 2006

(65) Prior Publication Data

US 2007/0186186 A1 Aug. 9, 2007

Related U.S. Application Data (60) Provisional application No. 60/765,224, filed on Feb. 3, 2006.

(51) Int. Cl.
*G06F 3/00* (2006.01)
*G06F 3/0482* (2013.01)
*G06F 3/0481* (2013.01)
*G06F 3/0489* (2013.01)

(52) U.S. Cl.
CPC ........ *G06F 3/0482* (2013.01); *G06F 3/04817* (2013.01); *G06F 3/04892* (2013.01)

(58) Field of Classification Search
CPC .... G06F 9/4443; G06F 3/0481; G06F 3/0482; G06F 3/04817; G06F 3/048; H01N 5/44543
USPC ......................................................... 715/866
See application file for complete search history.

(56) References Cited

U.S. PATENT DOCUMENTS

| | | | |
|---|---|---|---|
| 5,341,293 A | 8/1994 | Vertelney et al. | |
| 5,838,319 A * | 11/1998 | Guzak et al. | 715/854 |
| 5,867,163 A | 2/1999 | Kurtenbach | |
| 5,911,145 A * | 6/1999 | Arora et al. | 715/207 |
| 6,335,737 B1 | 1/2002 | Grossman et al. | |
| 6,466,237 B1 | 10/2002 | Miyao et al. | |

(Continued)

FOREIGN PATENT DOCUMENTS

| | | |
|---|---|---|
| KR | 2003-0055855 | 7/2003 |
| KR | 2005-0080382 | 8/2005 |

OTHER PUBLICATIONS

International Search Report dated Oct. 10, 2007, for PCT Application No. PCT/US2007/008193 filed Mar. 30, 2007, 9 pages.

(Continued)

*Primary Examiner* — Anil N Kumar
(74) *Attorney, Agent, or Firm* — James J. DeCarlo; Greenberg Traurig, LLP (57) ABSTRACT

In one example, a content navigation interface apparatus includes display logic for displaying selections for accessing a first entry of a content structure and a second entry of the content structure, wherein the second entry is a sub-entry of the first entry. The apparatus further including selection logic for determining the second entry for display based on a user characteristic (e.g., history, user profile, etc.). The first entry may be associated with a first level of a hierarchical content structure, and the second entry associated with a second level of the hierarchical content structure. In one example, the first entry is associated with a broad content category and the second entry associated with content, such as a media object.

13 Claims, 7 Drawing Sheets

(56) References Cited

U.S. PATENT DOCUMENTS

| | | | |
|---|---|---|---|
| 6,590,586 B1* | 7/2003 | Swenton-Wall | G06F 17/30274 707/E17.029 |
| 6,857,010 B1* | 2/2005 | Cuijpers et al. | 709/219 |
| D540,336 S | 4/2007 | Kim et al. | |
| 7,233,973 B2 | 6/2007 | Melet et al. | |
| D550,687 S | 9/2007 | Cho et al. | |
| D555,661 S | 11/2007 | Kim | |
| D567,817 S | 4/2008 | Kwag et al. | |
| 7,353,462 B2* | 4/2008 | Caffarelli | 715/825 |
| 7,681,149 B2* | 3/2010 | Landesmaki | 715/841 |
| 2003/0007012 A1* | 1/2003 | Bate | 345/825 |
| 2003/0146930 A1 | 8/2003 | Schelvis et al. | |
| 2004/0034646 A1* | 2/2004 | Kimball et al. | 707/102 |
| 2004/0142720 A1 | 7/2004 | Smethers | |
| 2004/0155909 A1 | 8/2004 | Wagner | |
| 2004/0216036 A1 | 10/2004 | Chu et al. | |
| 2005/0037814 A1* | 2/2005 | Yasui et al. | 455/566 |
| 2005/0050301 A1 | 3/2005 | Whittle et al. | |
| 2005/0188331 A1 | 8/2005 | Shimada et al. | |
| 2005/0231520 A1 | 10/2005 | Forest | |
| 2005/0240874 A1* | 10/2005 | Kiesekamp et al. | 715/745 |
| 2006/0053379 A1 | 3/2006 | Henderson et al. | |
| 2006/0069998 A1 | 3/2006 | Artman et al. | |
| 2006/0101350 A1 | 5/2006 | Scott | |
| 2007/0014278 A1 | 1/2007 | Ebbesen et al. | |
| 2007/0133876 A1 | 6/2007 | Chande et al. | |
| 2007/0157220 A1* | 7/2007 | Cordray et al. | 725/9 |
| 2007/0300187 A1 | 12/2007 | Hama et al. | |
| 2008/0072167 A1 | 3/2008 | Choi et al. | |
| 2008/0086699 A1 | 4/2008 | Antikainen et al. | |

OTHER PUBLICATIONS

U.S. Appl. No. 11/398,396, filed Apr. 4 2006, for Salay et al.
U.S. Appl. No. 11/502,758, filed Aug. 11, 2006, for Both et al.
U.S. Appl. No. 11/503,049, filed Aug. 11, 2006, for Both et al.
U.S. Appl. No. 11/264,435, filed Oct. 31, 2005, for Ebbesen et al.
Non-Final Office Action dated Jun. 25, 2008 for U.S. Appl. No. 11/502,758, filed Aug. 11, 2006, 7 pages.
International Search Report dated Jul. 15, 2008, for PCT Application No. PCT/US07/02727, filed on Jan. 31, 2007, three pages.
Written Opinion dated Jul. 15, 2008, for PCT Application No. PCT/US07/02727, filed on Jan. 31, 2007, five pages.
Nextel Communication, Inc. (Apr. 14, 2005). "Nextel AOL Instant Messenger," one page.

\* cited by examiner

CONTENT STRUCTURES AND CONTENT NAVIGATION INTERFACES

CROSS-REFERENCE TO RELATED APPLICATION

This application claims benefit of priority to previously filed U.S. provisional patent application Ser. No. 60/765,224, filed Feb. 3, 2006, entitled USER INTERFACE SYSTEMS AND METHODS, and is hereby incorporated by reference as if fully set forth herein.

BACKGROUND

Field

The present inventions relate generally to systems and methods for user interfaces, and in one example to a hierarchical content structure and content navigation interface for a device, such as a computer or mobile device.

Related Art

A variety of mobile computing devices exist, including, for example, personal digital assistants (PDAs), mobile phones, smart phones, camera phones, pocket personal computers, and the like. Mobile computing devices are performing an ever growing variety of functions, with the trend for mobile computing devices to have increased functionality such that a single mobile device may, for example, provide Internet access via a Web browser, maintain a personal calendar, provide mobile telephony, capture and store digital photographs, play music and video files, and so on. In short, it is generally desired that mobile devices approach or reach the capability and functionality of stand-alone computers (e.g., personal computers).

Generally mobile devices have less capable user input devices (e.g., keyboards, etc.) than stand-alone computers. For example, a mobile device may include a limited alpha-numeric keypad, directional buttons, and the like. Further, the display or viewing screen of the mobile device is often of a smaller size to suit the relatively small, compact size of a typical mobile device.

As the number and complexity of applications included with mobile devices increases, the ability for users to navigate content and use various applications and functions may become increasingly difficult, in part, because of the limited user input devices and viewing screens discussed above. Accordingly, it is desired to provide user interface elements and systems that may be used with a mobile device to navigate multiple applications or services, and may further provide improved ease of use of the device.

SUMMARY OF THE INVENTIONS

According to some aspects of the inventions provided herein, methods and systems for navigating and accessing information on a device (e.g., a mobile computer device, computer, or the like) are provided.

In one aspect provided herein, a content navigation interface apparatus is described. In one example, the content navigation interface includes display logic for displaying selections for accessing a first entry of a content structure and a second entry of the content structure, wherein the second entry is a sub-entry of the first entry. The apparatus further including selection logic for determining the second entry for display based on a user characteristic.

The first entry may be associated with a first level of a hierarchical content structure, and the second entry associated with a second level of the hierarchical content structure. In one example, the first entry is associated with a content category and the second entry associated with content, such as a media object.

The user characteristic for basing the determination of the second entry may include history data of the user, profile data of the user, or other such data associated with a user. Additionally, the apparatus may include advertising logic for displaying an advertisement with the display of the first and second entries (or otherwise). The advertisement may be displayed based upon a user characteristic, similarly or dissimilarly to the user characteristic for determining the second entry for display.

In another aspect, a method for navigating content on user device is provided. In one example, the method includes selecting a content structure, determining a user characteristic, and displaying selections to entries of the content structure based on the user characteristic. The selections may include a selection for accessing a first entry of the content structure, and a second entry of the content structure, wherein the second entry is a sub-entry of the first entry.

Additionally, in one example, the first entry is associated with a first level of a hierarchical content structure, and the second entry is associated with a second level of the hierarchical content structure. The first entry may be associated with a content category and the second entry associated with a media object.

According to another aspect, a computer program product comprising program code for a content navigation interface is provided. The computer program product may include program code operable for displaying selections to access a first entry of a content structure and a second entry of the content structure, wherein the second entry is a sub-entry of the first entry, and for determining the second entry for display based on a user characteristic.

Additionally, in one example, the first entry is associated with a first level of a hierarchical content structure, and the second entry is associated with a second level of the hierarchical content structure. The first entry may be associated with a content category and the second entry associated with a media object.

The various aspects and examples of the inventions are better understood upon consideration of the detailed description below in conjunction with the accompanying drawings and claims.

DETAILED DESCRIPTION OF THE INVENTIONS

The following description is presented to enable a person of ordinary skill in the art to make and use the inventions. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

According to one aspect described herein, content is categorized and navigable by a user interface in varying content levels (e.g., hierarchically similar to a data tree having folders and files). The varying content levels include entries corresponding to categories of content and/or content that are navigable by a user as varying panes or displays in which selections or options may be selected to access more specific content. In one example, an interface apparatus includes logic for displaying selections simultaneously for accessing entries of different levels of the content structure. For example, a user interface may include a selection for accessing a menu of options or categories of content, as well as selected content entries within the content structure (which are sub-entries of the higher level entry). The selection of narrow content to be displayed may be determined by selection logic in response to behavior of the user, community recommendations, or the like. For example, a high-level content display of "sports" may include a headline for an article relating to hockey or hockey scores in response to the particular user's interest or history of accessing hockey articles and hockey scores.

In another aspect, a content navigation interface (or a content navigation interface element) is provided, which may be used for navigating and accessing content on or accessible via a user device. In one example, the navigation interface displays multiple icons associated with different content, e.g., applications, services, and/or content such as media objects. The navigation interface moves or "rotates" the plurality of icons through a selection position and is referred to herein as an "icon carousel." When an icon is positioned at the selection position, content associated with the particular icon is displayed, e.g., in a content pane or window. Accordingly, a user may move or rotate through the icons and view content associated therewith. The selection position may be in the center of the navigation interface and the icons may be highlighted or otherwise identified when in the selection position. A user may select the icon positioned in the selection position to access the content and/or functionality associated with the particular icon.

Figure 1:
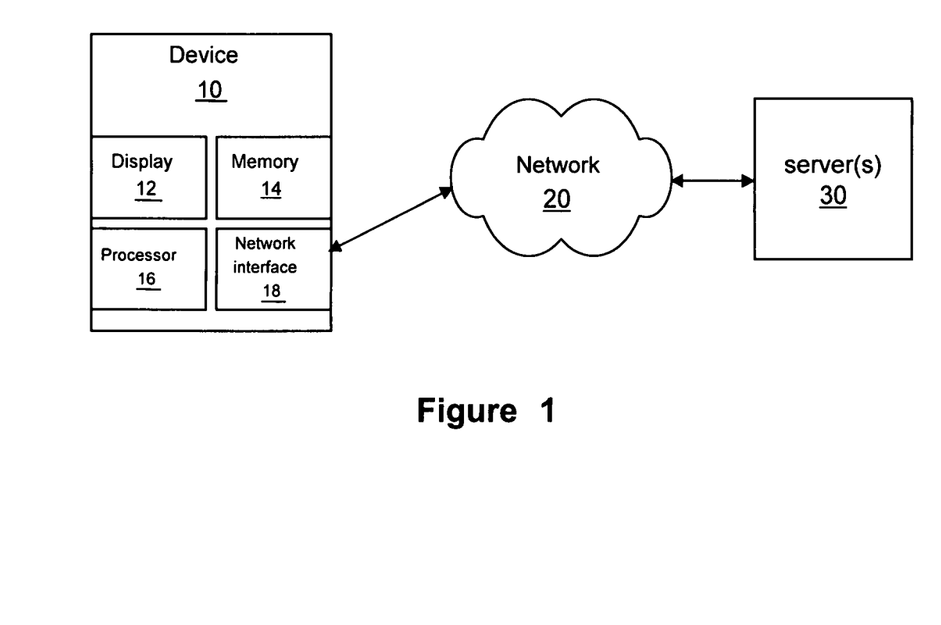
FIG. 1 illustrates an exemplary environment in which exemplary devices, systems, and methods described may be used.

FIG. 1 illustrates an overview of an exemplary environment in which some examples and aspects of a device and content navigation interface described herein may operate and be used. Broadly speaking, a device 10 (including, for example, a mobile computer device) communicates through a network 20 to at least one server 30, which may include account servers (e.g., email servers), mobile servers, and the like. It is noted that an account server, accessible by a user from device 10, may include one or more of a personal email account on an email server (e.g., Yahoo!® Mail), a family photo album account on a photo server (e.g., Yahoo!® Photos), a Personal Information Management (PIM) account on a PIM server (e.g., Yahoo!® Address book or Yahoo!® Notepad), a music library account on a multimedia library server (e.g., Yahoo!® Music), combinations thereof, and the like.

Device 10 may include various hardware, firmware, and/or software, and in particular, a processor 16 connected to an input device such as a keyboard, a network interface 18, a memory 14, and a display 12. Memory 14 (or other portions of device 10) may include logic or software operable with the device to display a content navigation interface and perform some or all of the functions described herein. Device 10 may be operable to include a suitable interface for a messaging facility, such as an email inbox, instant messaging (IM), short messaging service (SMS), multimedia messaging service (MMS), and the like. Device 10 may further be operable to display a web browser for accessing the Internet or user accounts, including webmail environments such as a Yahoo!® mail account or Hotmail® account, for example.

Device 10 may include, for example, a mobile phone, smart phone, Symbian® phone, pocket computer, digital camera, laptop, or handheld personal computer. Device 10 may further include a PIM device such as a Blackberry® or a Treo®, or more dedicated mobile phones that provide more limited information management services. Information management services may include, for example, PIM services such as calendar, address book, tasks, notes, and the like as are generally known.

Device 10 may communicate with one or more servers such as server 30 via network 20, which may include a wireless network, such as a wireless gateway, e.g., a cellular, satellite, or other wireless network. Additionally, device 10 may communicate via a non-wireless network such as a cable or fiber optic network, or a combination of wireless and non-wireless systems.

Network 20 generally includes suitable circuitry for connecting server 30 to network 20, and may be constructed for use with various communication protocols including, but not limited to, TCP/IP, UDP/IP, SMS, IM, and WAP. Network 20 may include or interface with circuitry and components for communicating information, such as email messages, media objects, graphical displays, advertiser data, and the like, over a wired and/or wireless communications medium. Further, network 20 may include or be associated with an SMS center and/or MMS center for transferring files.

Additionally, in one example, a router (not shown) is associated with network 20 and/or one or more servers, e.g., server 30, the router for processing and delivering content between device 10 and server 30. For example, a router may filter data and data structures, parse out data segments, import data, add item IDs to data segments. Additionally, the router may store segments not initially sent to device 10 in a repository (e.g., memory) for later delivery to device 10 and/or delivery to additional content nodes (e.g., other data sinks or data sources). An exemplary router is described, for example, in U.S. patent application Ser. No. 11/264,435, filed Oct. 28, 2005, and entitled "Content Router Core Variants," the entire content of which is incorporated herein by reference.

Server 30 may include logic or be programmed to format data, accessed from local or remote databases or other sources of data, for presentation to users of device 10, preferably in the format discussed in detail below. Server 30 may include a single device or plural devices, one or more backends, and the like, communicating (wired and/or wireless) and cooperating to perform some or all of the functions described herein. Server 30 may utilize various Web data interface techniques such as Common Gateway Interface (CGI) protocol and associated applications (or "scripts"), Java® "servlets", i.e., Java applications running on the Web server, or the like to present information and receive input from device 10.

It will be understood by those of ordinary skill in the art that not all the components described may be required, and variations in the arrangement and type of the components may be made without departing from the spirit and scope of the inventions.

Figure 2A:
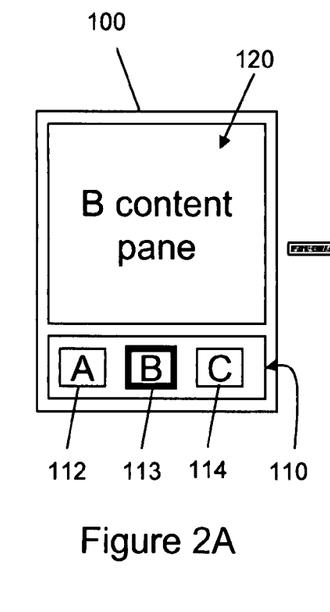
FIGS. 2A-2D illustrate an exemplary user interface, and operation thereof, for navigating and accessing content on a device.

FIGS. 2A-2D illustrate an exemplary user interface 100 for navigating and accessing information on a device. In particular, FIG. 2A illustrates user interface 100 including a content navigation interface element, referred to herein generally as icon carousel 110. Icon carousel 110 is operable to navigate and access content such as applications, services, and content on or accessible by an associated device. User interface 100 and the associated device include or access logic operable to display icon carousel 110, a plurality of icons 112-115, and content associated with the icons, e.g., the services, application, and/or content associated with each icon. Additionally, the user interface 100 and associated device include selection logic for moving the icons 112-115 of icon carousel 110 through a selection position, shown here centered within icon carousel 110, and displaying the associated content when the icon is positioned in the selection position.

In this example, icon carousel 110 includes four icons 112-115, where three of the icons are shown at any given time. Icon carousel 110 is operable to allow a user to "rotate" or move through icons 112-115 as shown by FIGS. 2A-2D. The displayed icons are arranged linearly and are virtually "rotated" in response to user input such that icons move together, e.g., to the left with the leftmost icon being removed and a new icon being added on the right of icon carousel 110. The new icon may include an icon that was not previously displayed, or the icon that was removed from the left. In this fashion, icons 112-115 may appear to a user to be rotating in-and-out of interface 110 and through the selection position.

Figure 2B:
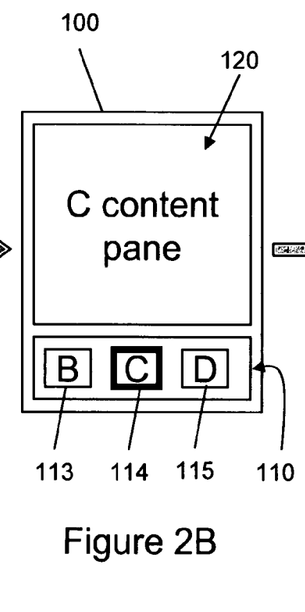
Figure 2C:
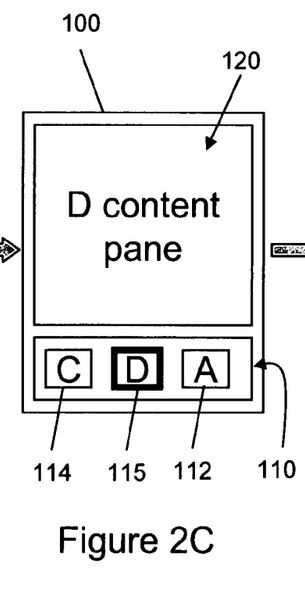
Figure 2D:
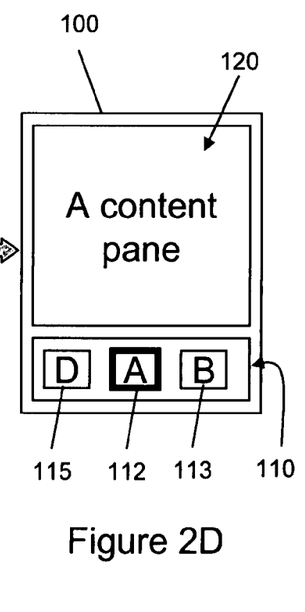

A user may rotate or move icons 112, 113, and 114 of icon carousel 110, e.g., by using an arrow key or other feature of an input device associated with a particular user device, thereby adding icon 115 to the display of icon carousel 110 and removing icon 113 from the display of icon carousel 110 (as seen in FIG. 2B). Further, the action moves icon 114 to the selection position (e.g., centered within icon carousel 110) and moves icon 113 from the selection position. In this example, the icon positioned at the selection position is highlighted, and remains in one location within icon carousel 110 and interface 100; in particular, centered within icon carousel 110. The icons 112-115 may move within icon carousel 110 in a smooth fashion, e.g., sliding from one position to the next, or may jump from one position to the next. Additionally, a user may rotate icon carousel 110 back to the original icon 113 and may rotate icon carousel 110 in a reverse direction.

Icons 112-115 may be associated with various services and application such as a web browser, email, instant messenger service, photos (e.g., Yahoo!® Photos), weather, news, search, local, sports, finance, entertainment, PIM applications, and the like. As icon carousel 110 is rotated, icons 112-115 are moved through the selection position at the center of icon carousel 110. The user interface 100 includes logic for displaying associated content, in this example, a content pane, in display region 120 for each icon 112-115 such that when successive icons 112-115 are in the selection position, user interface 100 displays a content pane within display 120 associated with that particular icon. The content pane may include a preview of the content associated with a selection of that particular highlighted icon.

As a user rotates icon carousel 110 to highlight one of icons 112-115, it should be understood that icons 112-115 may be highlighted in various fashions, e.g., bolded, enlarged, colored more vividly, different background or border, centered, or the like. Generally, icon carousel 110 or a feature of interface 100 may include an identifiable indicia that a particular icon is in a selection position and may be selected without further rotation of icon carousel 110. In another example, the icon is not highlighted, but it will be apparent that the icon is in a selection position because of the presence of its associated content pane being displayed.

The icons described herein may include any user-identifiable image displayed within the content navigation interface, in this example, within icon carousel 110. Further, the icons may be user configurable or configured by the device/application. For example, a device may be initially populated with default icons, such as an icon for mail, instant messenger, web browser, and the like. In other examples, a user may add or configure icons (e.g., by downloading from a server or uploading from another device). For example, a user may add an icon associated with a particular website, application, etc. Additionally, the icon appearance may be changed or altered by the user, e.g., to include a photo image, emoticon, text, and the like.

Figure 3:
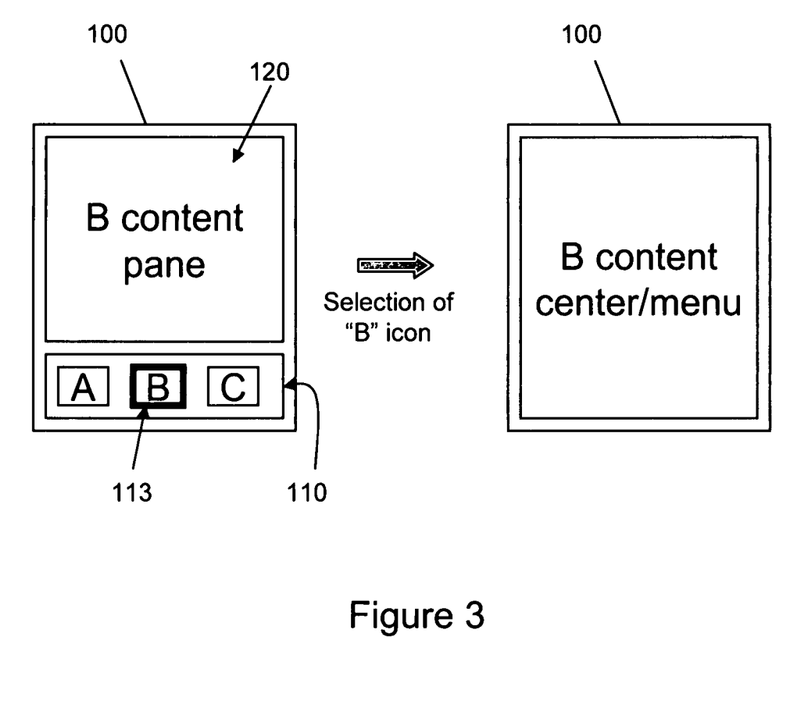
FIG. 3 illustrates an exemplary operation of a user interface for navigating and accessing content on a device.

A user may access content associated with the icon in the selection position (and highlighted, for example) of the icon carousel 110 by selecting the icon, e.g., pressing a key, scrolling up, or otherwise indicating a selection (e.g., clicking on the particular icon). Additional content and/or functionality may then be available to the user when selected as shown in FIG. 3. For example, content 130 or a menu of content or options may be displayed when icon 113 is selected. In one example, the icon carousel 110 remains visible to the user as content 130 is displayed. In other examples, the icon carousel 110 may be hidden when icon 113 is selected and content 130 displayed, and the icon carousel 110 may be viewed again, e.g., by an appropriate input via a keypad, "back" function, or the like.

In these examples, icon carousel 110 is illustrated as a horizontal feature at the bottom of user interface 100 having a linear arrangement of icons. A similar icon carousel 110 could be positioned differently, e.g., at the top of the interface 100, be oriented as a vertical feature, or the like.

Figure 4A:
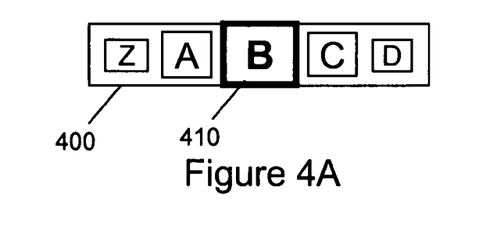
FIGS. 4A-4C illustrate exemplary user interface elements for navigating content.
Figure 4B:
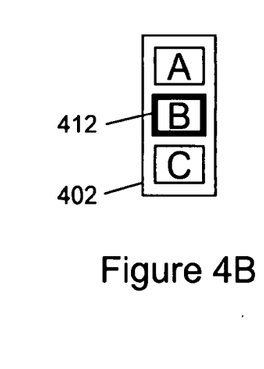

FIGS. 4A-4B illustrate exemplary content navigation interface elements according to other examples. In particular, FIG. 4A illustrates an exemplary icon carousel 400 illustrating five icons "A" through "D" and "Z" arranged linearly, where the icon in the selection position 410 (in this example, centered within carousel 400) is displayed larger in size than non-selected icons. Additionally, more distant icons from the selection positions are displayed progressively smaller. Icon carousel 400 also indicates that more than 5 icons are accessible through icon carousel 400; in particular, a user may rotate icon carousel 400 to navigate and view successive icons "A" through "Z." It is too be further understood that each icon "A" through "Z" includes a content pane or other content associated therewith that may be displayed when in the selection position and/or selected by a user.

FIG. 4B illustrates an exemplary icon carousel 402 in which icon carousel 402 is oriented vertically. Icon carousel 402 may operate similarly to icon carousel 110 or 400, but with icons capable of moving or rotating up-and-down (as opposed to left-and-right) through a selection position, shown here centered at 412. The icon carousels 400 and 402 shown in FIGS. 4A and 4B may be placed in various locations within a display as described.

Figure 4C:
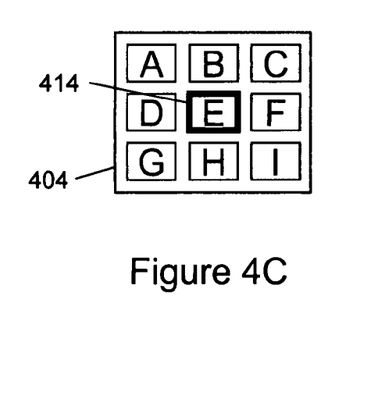

FIG. 4C illustrates an exemplary icon carousel 404 which may be moved or rotated both vertically and horizontally, with icons dropping off and being added based on the direction of movement. The selection position 414 is indicated as being in the center of icon carousel, however, in other examples, the selection position 414 could be located in a different location, e.g., a corner, centered in the top row, etc. Thus, various other modifications and variations to the examples described herein will be apparent.

Figure 5:
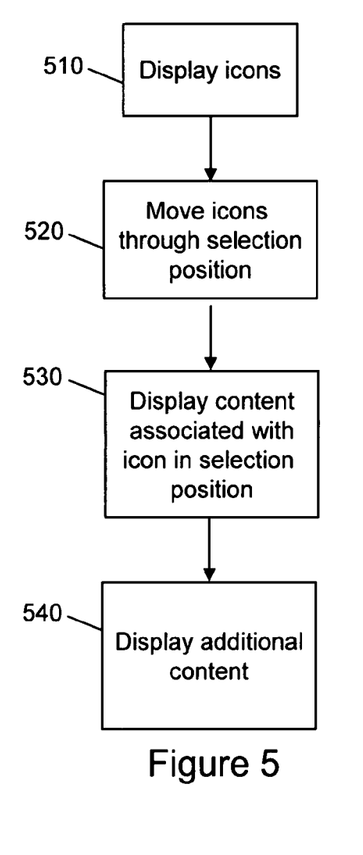
FIG. 5 illustrates an exemplary method for navigating content on a device.

FIG. 5 illustrates an exemplary method for navigating content on or accessible by a user device. A plurality of icons are displayed to a user at 510 with a user interface or user interface element. For example, the icons are displayed within a graphical user interface of a device such as a mobile computer device. The icons may be displayed based on logic included with the device or accessed via a network and server system.

The interface is further operable to move the displayed icons at 520 in response to user input. For example, the icons may be arranged linearly (e.g., horizontally and/or vertically), and movable through a selection position. When icons are moved some of the icons may be removed from the display and additional icons displayed in their place. Further, content associated with an icon positioned at a selection position of the interface is displayed at 530. The content may include, for example, a portion of the content, a preview of the content, or a description of the content. The content my be displayed in a common window, display, etc., or different windows, displays, etc.

In response to a user selecting an icon located at the selection position, additional content is displayed at 540. The additional content may be displayed within the user interface, whether in the same or a different window or panel of the user interface. In other examples, an action or function may take place upon selection, e.g., accessing the phone or voicemail functions of the device.

According to another aspect provided herein, content is displayed and accessible through a user device within a hierarchical content structure. In one example, the hierarchical content structure includes several layers of content, generally organized as a data tree structure ranging from entries associated with high-level categories of content to individual content entries. The entries may correspond generally to folders and files of a data tree structure and may include a category heading, a grouping of content, individual content, and so on. For example, a news article may be a sub-entry of a "local news" entry, which is in turn a sub-entry of a "news" entry within a hierarchical content structure (and where the news article is a sub-entry of both "local news" and "news").

The hierarchical content structure may further have levels of content, with a group of entries residing on a common level; for example, a plurality of news articles may all reside on the same level of the hierarchical content structure. Further, some or all of the news articles may be a sub-entry of entries on higher levels of the hierarchical content structure, e.g., "sports news," "business news," "entertainment news," and so on. In one example, a user may navigate entries within a level of the hierarchical content structure without returning to a higher level to select different entries.

The content may include media objects such as documents, articles, photos, audio files, video files, and the like. Additionally, the content may include selections or links to further content accessible by the interface and associated user device, e.g., web pages and the like stored locally or remotely to a user device.

Figure 6:
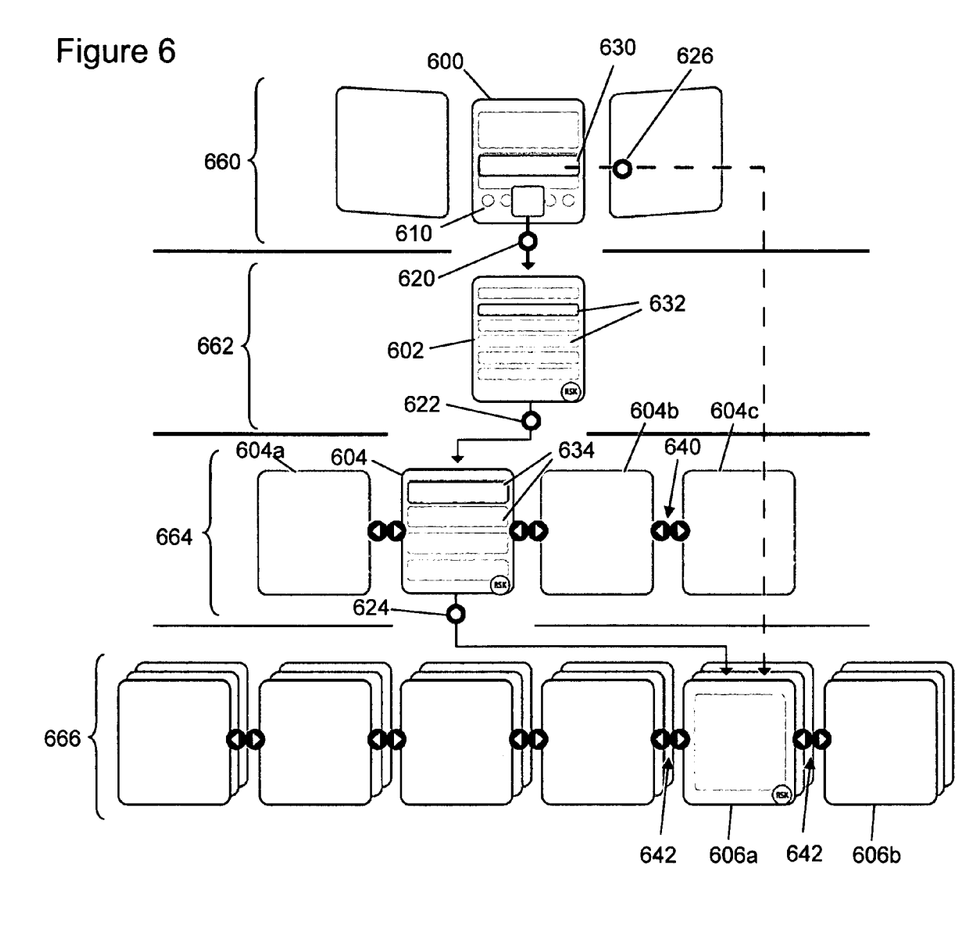
FIG. 6 illustrates an exemplary hierarchical content structure and display of the content for a content navigation interface.

FIG. 6 illustrates an exemplary hierarchical content structure and navigation of the content structure according to one example. Broadly speaking, and in one example, content is categorized or layered into multiple levels 660, 662, 664, and 666, generally from broad entries corresponding to categories of content down to narrow entries corresponding to individual content. A content navigation interface apparatus may include display logic operable to display a selection to a first entry of the first level 660, e.g., a broad category of content available or accessible. The interface further includes logic for displaying a second entry to individual content (e.g., a sub-entry of the displayed entry of the first level) of a lower level of the content structure, the first and second entries being displayed together.

Initially, the hierarchical content structure and navigation of the hierarchical content structure will be described. A user may have access to multiple hierarchical content structures (whether similar or dissimilar as that shown) via interface display 600 as indicated by the outlined panes to the left and right thereof, and which may be accessible by any suitable means (e.g., via content navigation element 610). For example, content panes corresponding to different types or categories of content available or accessible by an associated device. Of course, multiple hierarchical content structures may also be considered or treated as belonging to a single content structure. In other examples, however, all accessible content may branch from a single content pane at the first level 660 (i.e., all accessible content may be organized as a single data structure).

A content navigation interface apparatus includes logic for displaying selections for navigating from first level 660 to one or more entries of second level 662 and so on down to specific content entries at the fourth level 666 as illustrated by interface displays 600, 602, 604, and 606a, 606b, etc. Additionally, the content navigation interface includes logic for displaying a selection 630 for accessing entries of a lower level, e.g., fourth level 666 directly, bypassing second and third content levels 662 and 664. In particular, a user may select and access selective content 606a directly, as indicated by arrow 626, for example.

The particular content entry 606a and selection 630 displayed with interface display 600 may be based on a user characteristic, e.g., based on a user profile or history of use. For example, content logic may be included to select content of lower levels if particular content is accessed a certain number of times, given frequency, or the like. The content logic may also include selected content based on a user profile or other associations of the user such as community groups, subscriptions, and the like. Additionally, in one example, content selections may be initially selected randomly from a lower level for display within interface display 600.

A user may access second level 662 and interface display 602 by selecting the content pane displayed within interface 600 (e.g., via selection panel 610) as indicated by arrow 620. Interface display 602, associated with second level 662, may include entry selections 632 associated with categories of content, content, or combinations thereof. In one example, interface display 602 and entry selections 632 comprise a menu of options or categories of further content included with third and fourth levels 664 and 666. Accordingly, a user may enter a selection 632 to access via arrow 622 one or more further interface displays of content or categories as illustrated in third level 664 and interface 604, 604a, 604b, and so on.

In this example, entries of third level 664 are navigable by a user without returning to second level 662 and interface display 602. For example, a user may use keys such as left and right arrows to move between interface display 604 and other available entries of the third level 664 (e.g., 604a, 604b, and 604c) without returning to the second level 662 as indicated by arrows 640.

Further, similar to interface display 602, a user may select from one or more entry selections 634 of interface display 604 to access entries of the next level, fourth level 666. For example, a user may select an entry selection 634 to access via arrow 624 content 606a, 606b, and so on. Additionally, and similar to navigation of entries of third level 664, content organized in the fourth level 666 is navigable by a user without returning to a higher level as indicated by arrows 642.

Figure 7:
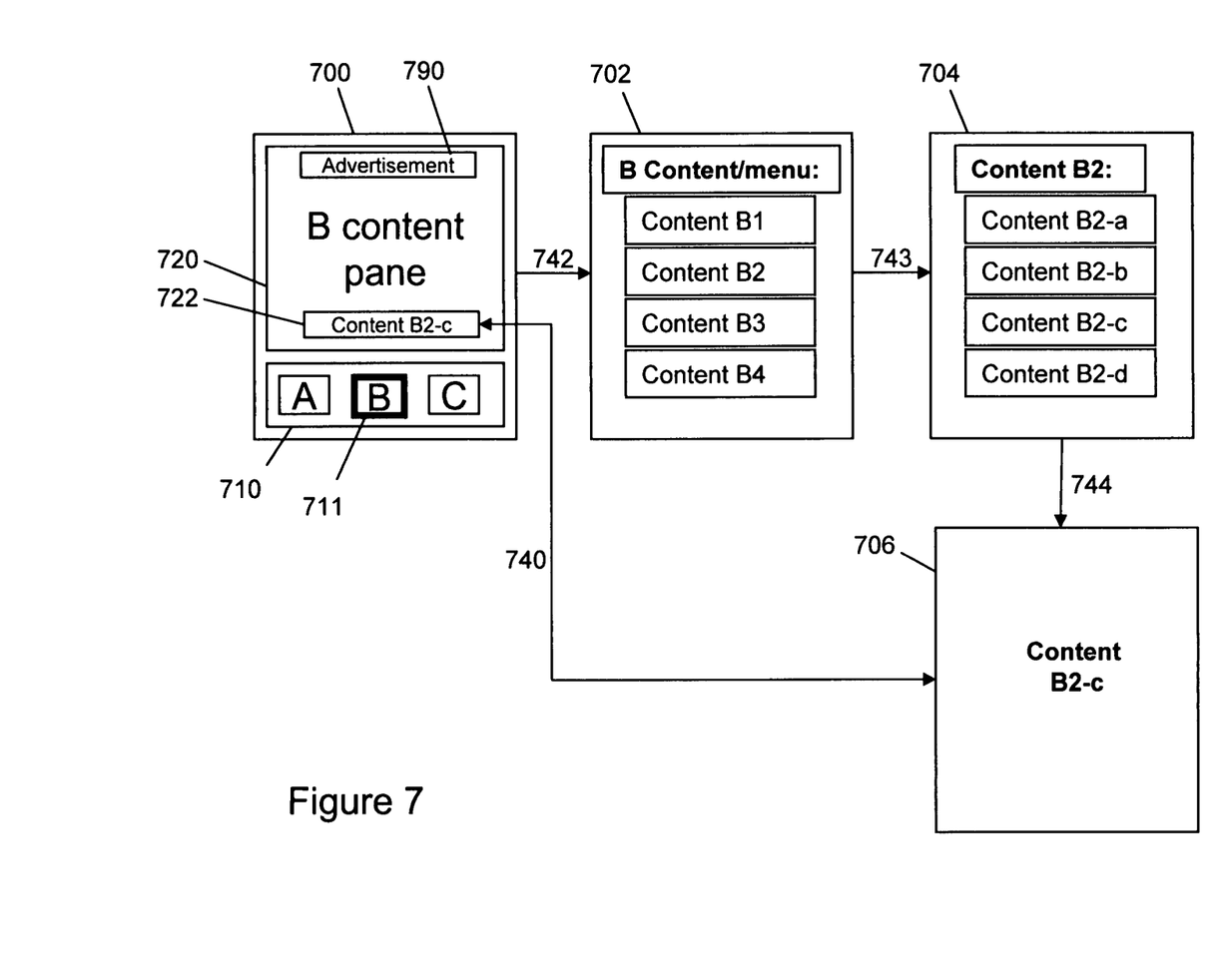
FIG. 7 illustrates an exemplary user interface displaying content on a device, the content categorized and displayed from different levels of a hierarchical content structure.

FIG. 7 illustrates an exemplary user interface apparatus 700 having logic for navigating and accessing content according to one example. In this example, content accessible via user interface 700 is categorized in a data tree format or hierarchical levels as described above, for example, from a high-level of content (e.g., a categorization of content) to a narrow or low-level of content. User interface 700 illustrates a high-level, broad category within the content structure. In this instance a content pane 720, which may include a broad category of content such as a category of content available or accessible to a user device (e.g., sports, news, entertainment, finance, etc).

User interface 700 further includes a content navigation element 710 (e.g., a selection element similar to icon carousel 110 described above) of which icon 211 is in the selection position. In this example, the content is categorized in four hierarchical or nested levels, a first level including the content pane shown, a second level including a menu or options of content, a third level including further nested content options, and a fourth level including entries of content. For example, the first level may include a "sports" page or channel of content, the second level may include various sports, such as football, basketball, hockey, etc., the third level may include news article headlines associated with each of the sports, and the fourth level may include the articles themselves. It should be recognized that other organization schemes and content types may be used.

Content pane 720 illustrates the first level, e.g., a content pane associated with a categorization of content, and further includes content 722 of a lower level of a content structure (e.g., a specific content entry within the categorization of content). Content 722 from a lower level may be viewed and/or selected from the high level user interface 700 as indicated by arrow 740 (and as shown in interface display 706). As described, the display of content 722 with the display of content pane B (i.e., the display of entries of different levels of the content structure), may be determined based on a user characteristic such as a user profile, user history, and the like. In other examples, content 722 may correspond to entries at other levels, e.g., entries displayed in interface 704, e.g., "Content B2".

Additionally, in response to a selection of icon 711 (or content page 720), interface display 702 is displayed as indicated by arrow 742. A user may navigate user interface 702 to select options, e.g. content categories B1, B2, and so on therein to access a lower content level as shown in user interface 704 and indicated by arrow 743. Within user interface 704, a user may further navigate and select an option, e.g., content B1-1, B1-2, and so on as shown in interface 706 and indicated by arrow 744. Accordingly, arrows 742, 743, and 744 illustrate the user interfaces 702, 704, and 706 as a user or device selects and drills down to more narrow, specific content (e.g., from a broad category of sports to a specific sports related article).

Additionally, an advertisement 790 may be included within user interface 700. Advertisement 790 may be included based on a user characteristic in a similar or dissimilar fashion as content 722. For example, the user history or profile may be used to determine the particular advertisement. Additionally, an advertisement may be displayed in each display of user interface 702, 704, and 706, as will be recognized by those of ordinary skill in the art.

Figure 8:
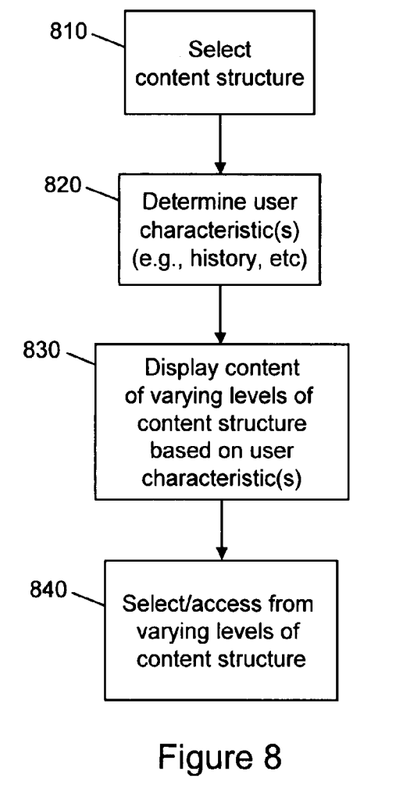
FIG. 8 illustrates an exemplary method for navigating a hierarchical content structure.

FIG. 8 illustrates an exemplary method for navigating a hierarchical content structure via a content navigation interface. The content navigation interface may be similar or different to those described herein. Initially, a content structure is selected in 810, which may include a hierarchical data structure, data tree structure, or similar data structure. For example, a user operating a suitable device may access and select from one or more content structures available or accessible via the device. In other example, all content available or accessible via the device may be organized and navigated as a single content structure.

At least one user characteristic is determined at 820. For example, the user characteristic may include data from a user profile, user history stored or associated with the device or user, and other data associated with the user. The at least one user characteristic is then used to selectively display entries of content categories or content of the content structure at 830. For example, content of varying levels of the content structure is displayed (e.g., a first and second entry, wherein the second entry is sub-entry of the first entry), where the content of a lower level is displayed based on the at least one user characteristic. A user may then select from the displayed entries at 840 to access entries at varying levels of the content structure.

The various aspects and examples of the inventions can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computing device comprising:
a processor;
a non-transitory computer-readable storage medium for tangibly storing thereon program logic for execution by the processor, the program logic comprising:
accessing logic executed by the processor for accessing a content structure, the content structure comprising:
a first entry;
a second entry, wherein the second entry is a sub-entry of the first entry; and
a third entry, wherein the third entry is a sub-entry of the second entry;
display logic executed by the processor for displaying, within a portion of a user interface (UI), a scrolling icon carousel comprising icons and a content pane, each icon corresponding to one of the first, second and third entry, and having an initial background display within the content pane of said scrolling icon carousel, and the content pane comprising a display of a preview of a portion of content associated with each of the first, second and third entries;
receiving logic executed by the processor for receiving a selection of the icons associated with the first and third entries;
display logic executed by the processor for accessing the content structure and displaying, based on said received selection, the first entry and the third entry together within said UI without displaying the second entry, said display of the first and third entries comprising enlarging the selected icons associated with the first and third entries, wherein display of the third entry comprises at least a partial display, and changing the initial background display for the selected icons from the initial background to a different background;
identification logic executed by the processor for identifying a user characteristic associated with a user viewing the UI; and
determination logic executed by the processor for determining, based on said user characteristic and the third entry, an additional content item to display within said UI.

2. The computing device of claim 1, wherein the first entry is associated with a first level of a hierarchical content structure, the second entry is associated with a second level of the hierarchical content structure, and the third entry is associated with a third level of the hierarchical content structure.

3. The computing device of claim 1, wherein the first entry is associated with a content category and the third entry is associated with a media object.

4. The computing device of claim 1, wherein the user characteristic comprises history data of the user.

5. The computing device of claim 1, further comprising advertising logic for displaying an advertisement.

6. A method comprising:
determining, by a computing device, a user characteristic;
accessing, by the computing device, a content structure, the content structure comprising:
a first entry;
a second entry, wherein the second entry is a sub-entry of the first entry; and
a third entry, wherein the third entry is a sub-entry of the second entry;
displaying, by the computing device, within a portion of a user interface (UI), a scrolling icon carousel comprising icons and a content pane, each icon corresponding to one of the first, second and third entry, and having an initial background display within the content pane of said scrolling icon carousel, and the content pane comprising a display of a preview of a portion of content associated with each of the first, second and third entries;
receiving, by the computing device, a selection of the icons associated with the first and third entries;
accessing the content structure and displaying, by the computing device, based on said received selection, the first entry and the third entry together within said UI without displaying the second entry, said display of the first and third entries comprising enlarging the selected icons associated with the first and third entries, wherein display of the third entry comprises at least a partial display, and changing the initial background display for the selected icons from the initial background to a different background;
identifying, by the computing device, a user characteristic associated with a user viewing the UI; and
determining, by the computing device, based on said user characteristic and the third entry, an additional content item to display within said UI.

7. The method of claim 6, wherein the first entry is associated with a first level of a hierarchical content structure, the second entry is associated with a second level of the hierarchical content structure, and the third entry is associated with a third level of the hierarchical content structure.

8. The method of claim 6, wherein the first entry is associated with a content category and the third entry is associated with a media object.

9. The method of claim 6, wherein the user characteristic comprises history data of the user.

10. A non-transitory computer readable storage medium tangibly comprising program code executed by a processor for navigating content, the non-transitory computer readable storage medium comprising program code for:
accessing a content structure, the content structure comprising:
a first entry;
a second entry, wherein the second entry is a sub-entry of the first entry; and
a third entry, wherein the third entry is a sub-entry of the second entry;
displaying within a portion of a user interface (UI), a scrolling icon carousel comprising icons and a content pane, each icon corresponding to one of the first, second and third entry, and having an initial background display within the content pane said scrolling icon carousel, and the content pane comprising a display of a preview of a portion of content associated with each of the first, second and third entries;
receiving a selection of the icons associated with the first and third entries;
accessing the content structure and displaying, based on said received selection, the first entry and the third entry together within said UI without displaying the second entry, said display of the first and third entries comprising enlarging the selected icons associated with the first and third entries, wherein display of the third entry comprises at least a partial display, and changing the initial background display for the selected icons from the initial background to a different background;
identifying a user characteristic associated with a user viewing the UI; and determining, based on said user characteristic and the third entry, an additional content item to display within said UI.

11. The non-transitory computer readable storage medium of claim 10, wherein the first entry is associated with a first level of a hierarchical content structure, the second entry is associated with a second level of the hierarchical content structure, and the third entry is associated with a third level of the hierarchical content structure.

12. The non-transitory computer readable storage medium of claim 10, wherein the first entry is associated with a content category and the third entry is associated with a media object.

13. The non-transitory computer readable storage medium of claim 10, wherein the user characteristic comprises history data of the user.

* * * * *